United States Patent [19]
Grosseau

[11] 3,824,878
[45] July 23, 1974

[54] DEVICE FOR AUTOMATICALLY CONTROLLING A GEARBOX

[75] Inventor: Albert Grosseau, Chaville, France

[73] Assignee: Societe Anonyme Autmobiles Citroen, Paris, France

[22] Filed: Mar. 27, 1972

[21] Appl. No.: 238,109

[30] Foreign Application Priority Data
Apr. 5, 1971   France .............................. 71.11921

[52] U.S. Cl. .............................. 74/866, 250/231 SE
[51] Int. Cl. ........................ B60k 19/00, G01d 5/34
[58] Field of Search .................. 74/866; 250/231 SE

[56] References Cited
UNITED STATES PATENTS

| | | | |
|---|---|---|---|
| 2,932,211 | 4/1960 | Vermhes.............................. | 74/866 |
| 3,306,159 | 2/1967 | Beall, Jr. et al................ | 250/231 SE |
| 3,360,655 | 12/1967 | McKeown ...................... | 250/231 SE |
| 3,673,892 | 7/1972 | Kato et al. ......................... | 74/866 X |

Primary Examiner—Samuel Scott
Assistant Examiner—P. S. Lall
Attorney, Agent, or Firm—Stevens, Davis, Miller & Mosher

[57] ABSTRACT

A device comprising means capable of emitting an electrical signal and means responsive to said signal and adapted to command a change of gear. The means capable of emitting the signal include a light source which can be caused to communicate with a receiver element capable of triggering the electrical signal, and two rotatable shafts, the angular amplitudes of whose rotations depend respectively on engine operating parameters. The two shafts cooperate with means for causing the light emitter and receiver to communicate. Application to the control of an automobile gearbox.

10 Claims, 9 Drawing Figures

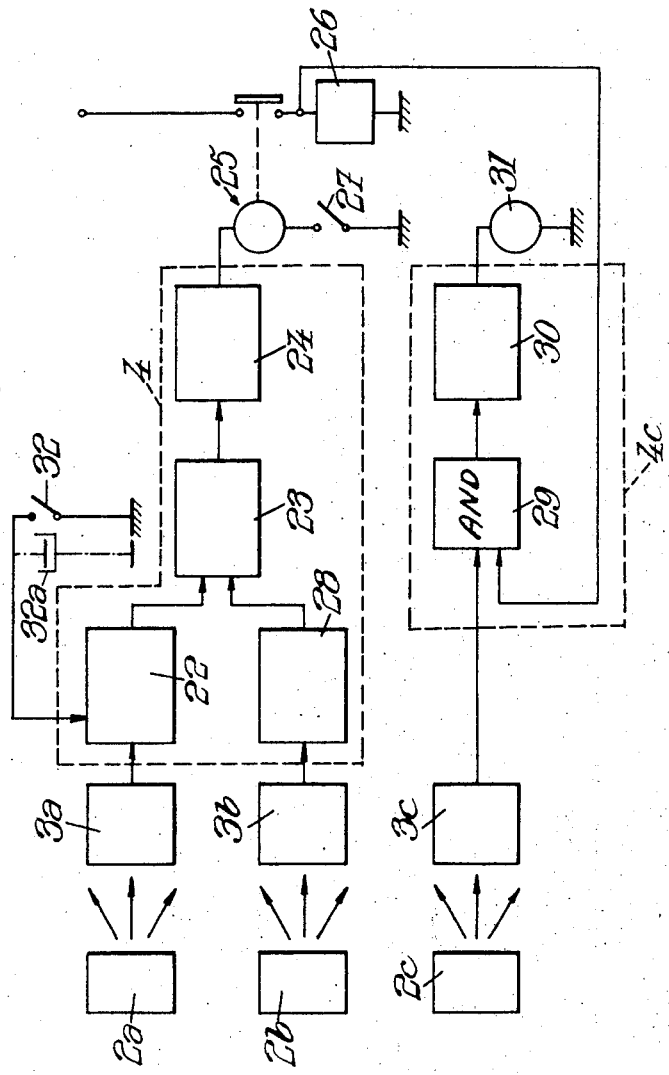

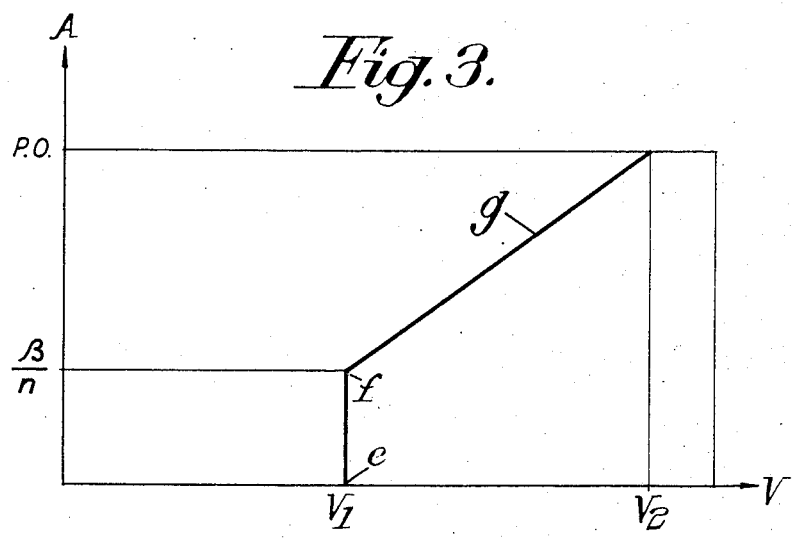
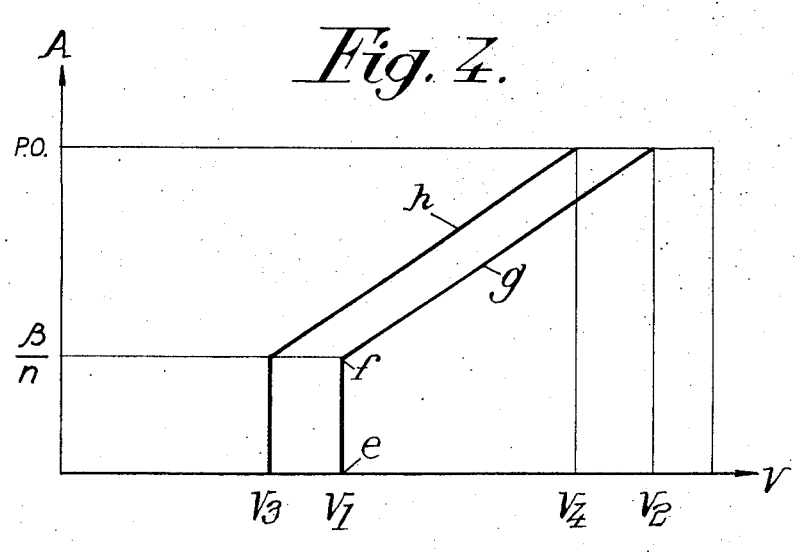

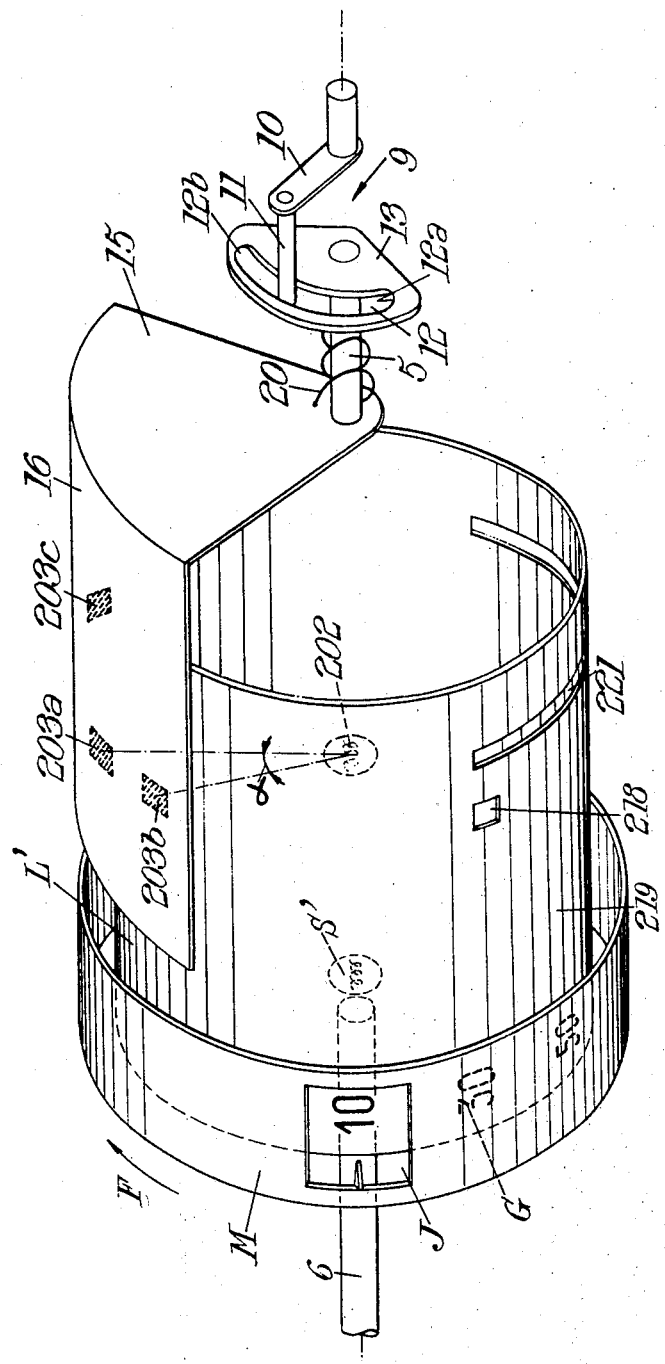

DEVICE FOR AUTOMATICALLY CONTROLLING A GEARBOX

This invention relates to a device for automatically controlling at least one gear ratio in a stepped-ratio gearbox for vehicles driven by an internal combustion engine equipped with a throttle valve, comprising means for emitting an electrical signal which commands the engagement of a gear ratio in the gearbox, which means include an electromagnetic radiation emitter element, a receiver element sensitive to said radiation and adapted to deliver the electrical signal when said radiation impinges upon it, one at least of the receiver and emitter elements being fast with a first rotatable shaft, and a screen positioned between the emitter and receiver elements and angularly fast with a second rotatable shaft parallel with the first shaft, which screen includes at least one window permeable to the electromagnetic radiation and so positioned as to communicate the emitter element with the receiver element when the two rotatable shafts are in a particular angular position relative to each other, one of the two rotatable shafts being driven by means for imparting a rotation to it, the angular amplitude of which depends on the speed of the vehicle.

The invention relates more particularly, though not exclusively, to a device for automatically controlling the highest gear ratio in a gearbox for motor vehicles.

It is a primary objective of the invention to provide a simple and inexpensive automatic control device in which such automatic control is exercised on the basis of important engine functional parameters.

A device according to the present invention for automatically controlling at least one gear ratio in a stepped-ratio gearbox of the above-mentioned kind is characterised by the fact that it includes drive means for continuously driving the second rotatable shaft responsively to the throttle-valve over a range of rotations of determinate angular amplitudes, said drive means being so devised that, over said range, the intercommunication between the emitter element and the receiver element that causes a gear change to take place in the gearbox is effected at continuously variable and increasingly higher vehicle road speeds, as a function of the angular opening of the throttle-valve.

Preferably, the automatic control device includes a pair of angularly offset receiver elements rigid with the same rotatable shaft and respectively associated to a pair of consecutive gearbox ratios, one of the receiver elements being adapted to cause delivery of an electrical signal for commanding upward gear changes from the lower ratio to the upper ratio, and the other receiver element being adapted to command downward gear changes from the upper ratio to the lower ratio.

Preferably also, the means for driving the second rotatable shaft responsively to the engine throttle-valve include a multiplier mechanism for imparting to the rotatable shaft an angular amplitude which is a multiple of the throttle-valve rotation, and a sector-shaped member perpendicular to the rotatable shaft and angularly rigid therewith and embodying an arcuate slot which is adapted to so cooperate with a stub axle driven by said multiplier mechanism that the rotatable shaft be driven by the throttle-valve only beyond a minimum angular opening thereof.

If the screen is of the cylindrical type, it is angularly rigid with that one of the rotatable shafts the rotation of which is of an angular amplitude dependent on the speed of the vehicle, and a portion of the surface of said screen preferably bears graduation marks adapted to travel past a window fixedly embodied in the dashboard of the vehicle, which window and graduated surface jointly form the vehicle's speedometer.

The description which follows with reference to the accompanying non-limitative exemplary drawings will give a clear understanding of how the invention can be carried into practice.

In the drawings:

FIG. 2 is a block diagram of the electronic unit used with the control device according to this invention;

FIG. 3 is a graphic representation of the relationship existing between the throttle-valve opening angle, plotted along the Y-axis, and the speed, plotted along the X-axis, of a vehicle equipped with an automatic control device according to this invention, during the change from fourth gear to fifth gear;

FIG. 4 is a graphic representation of the relationships existing between the throttle-valve opening angle and the speed of the vehicle when changing up from fourth gear to fifth gear and when changing down from fifth gear to fourth gear;

FIG. 9 depicts an alternative embodiment of the device shown in FIG. 1.

Figure 1:
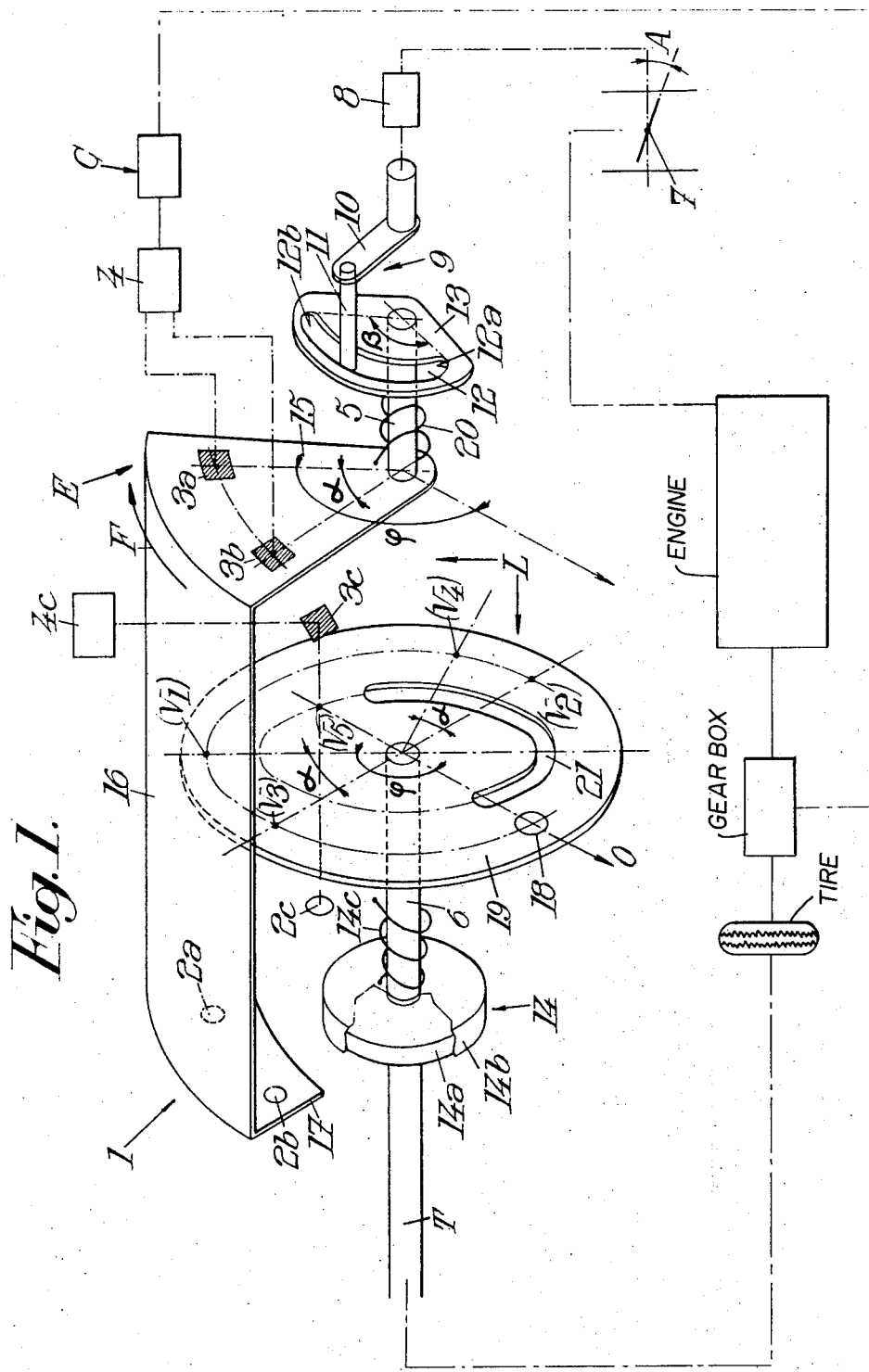
FIG. 1 is a diagrammatic perspective showing of an automatic control device according to the invention.

Reference to FIG. 1 shows the main component parts of a device according to this invention for automatically controlling at least one gear ratio in a stepped-gears gearbox for an internal combustion engine driving a motor vehicle. To fix ideas, and for non-limitative exemplary purposes, it will be assumed that the gear ratio to be controlled is the highest ratio in the gearbox and that this ratio is the fifth gear. By a device for automatically controlling at least one gear ratio is to be understood a device capable of causing engagement of that gear whenever the functional parameters of the engine assume specific values, and moreover to cause, if necessary, depending on the values assumed by said parameters, a change from that gear ratio to a lower gear ratio (or to a higher gear ratio if the ratio which is automatically controlled is not the highest).

The automatic control device 1 includes means E adapted to emit an electrical signal whenever the values of two engine operating parameters, to wit the rotation speed N of a rotating shaft T driven by the engine and the angular opening A of the engine throttle-valve, satisfy a predetermined relationship.

The device 1 further includes means C sensitive to the electrical signal emitted by the means E and adapted to control the sequence of operations required to bring about a change of gear in the gearbox (not shown).

The means E comprise two electromagnetic radiation emitters preferably consisting of light sources 2a, 2b and adapted to be capable of communicating respectively with two electromagnet radiation-sensitive receiver elements consisting of photosensitive detectors 3a, 3b.

It is to be noted that an emitter element is said to communicate with a receiver element when the electromagnetic radiation from the former impinges upon the latter.

Detectors 3a, 3b are electrically connected to an electronic unit 4 in such manner that when detector 3a or 3b is illuminated by the corresponding light source the electronic unit 4 delivers an electrical output signal capable of commanding a gear change in the gearbox.

The means E further include two rotatable shafts 5, 6 having a common geometrical axis and the angular amplitudes of the rotations of which depend on the angular opening A of the throttle-valve and on the rotation speed N of the engine-driven shaft T, respectively.

The rotation of the throttle-valve spindle 7 is transmitted to the shaft 5 through a multiplier mechanism 8 (portrayed schematically), providing a multiplication ratio n, and a slot-and-axle device 9. The device 9 includes a radial arm 10 adapted to rotate about the same axis as that of shaft 5 and carrying an axle 11 extending parallel with said axis. The end of axle 11 remote from arm 10 engages into an arcuate slot 12 which subtends an angle $\beta$. The slot 12 is formed in a circular sector 13 fast with shaft 5 and the plane of which is orthogonal to the axis of shaft 5.

Shaft 6 is driven by rotating shaft T through a conventional system 14 of the kind used for speedometers on automobile dashboards. The system 14 includes a magnetized drum 14a which is fast with shaft T and the centerplane of which is orthogonal to the axis thereof, and a metal cup 14b fast with shaft 6 which has its centerplane orthogonal to said shaft and which encloses drum 14a without being in physical contact therewith. Cup 14b is additionally subjected to the action of a return coil spring 14c. When drum 14a is rotated by shaft T, the cup 14b is subjected by it to a rotating moment opposite to the return moment exerted by the spring 14c. This rotating moment is substantially proportional to the rotation speed of drum 14a, whereby each position of equilibrium of cup 14b corresponds to a degree of angular rotation thereof proportional to the rotation speed of shaft T.

Thus the extent to which shaft 6 is rotated depends on, and in this instance is proportional to, the rotation speed of shaft T.

Shafts 5 and 6 cooperate with means L for communicating the light sources 2a, 2b with the respective photosensitive detectors 3a, 3b when the shafts 5 and 6 are rotated to extents such that the rotation angle A of the throttle-valve and the rotation speed N of the shaft T satisfy a predetermined algebraic relation.

The means L include means for interlinking the rotation of shaft 5 with the photosensitive detectors 3a, 3b, which interlinking means are formed by a circular sector 15 fast with shaft 5 and having its plane orthogonal to the axis thereof. The circular contour of sector 15 is rigid with a cylindrical wall portion 16 the generatrixes of which are perpendicular to the plane of sector 15 and extend away from shaft 5. The end of cylindrical wall portion 16 remote from sector 15 is formed with a flange 17 extending radially towards the axis of shaft 6. Flange 17 lies in a plane parallel to that of sector 15 but stops short of the common geometrical axis of shafts 5 and 6. The light sources 2a, 2b are carried on flange 17 and are so positioned that the straight lines joining their centers to the centers of the detectors 3a, 3b carried by sector 15 are parallel to the common geometrical axis of shafts 5 and 6. The compound formed by sector 15, cylindrical wall portion 16 and flange 17 is of yoke-like shape.

The means L further include a circular window 18 formed in a screen 19 which is angularly rigid with shaft 6 and is located between the light sources 2a, 2b and the photosensitive detectors 3a, 3b.

The screen 19 is formed by a flat disc made of a material which is opaque to the light emitted by the sources 2a, 2b, an example of such a material being metal. The plane of disc 19 is orthogonal to the axis of shaft 6. The window 18 is permeable to the light emitted by sources 2a, 2b and may consist for example of a hole formed in disc 19.

The detectors 3a, 3b lie on a circumference centered upon the axis of shaft 5, and the distance from window 18 to the axis of shaft 6 is equal to the radius of said circumference, whereby each source 2a, 2b can communicate with the corresponding detector only when the relative positions of the disc 19 and the source in question are such that the center of window 18 lies on the straight line joining the detector and the source.

The origin-direction with respect to which the angular amplitudes of the rotations of shafts 5 and 6 or of sector 15 and disc 19 are determined, may be taken with advantage to be the axis O which joins the center of the disc 19 to the center of the window 18 when the disc is in a position corresponding to zero rotation speed of shaft T.

Since the angular amplitude of the rotation of window 18 depends on the rotation speed of shaft T, the circumference described by window 18 can be graduated as rotation speeds of shaft T. The latter shaft preferably rotates at a speed equal or proportional (with a constant ratio) to the rotation speed of the wheels of the vehicle. The circumference described by window 18 can therefore be graduated directly to show the speed of the vehicle.

The sector 15 is maintained in a datum position (shown in FIG. 1) by a return spring 20. When the sector 15 is in this datum position, the straight line joining the source 2a to detector 3a intercepts the disc 19 at a point whose polar angle $\psi$ with respect to the origin-direction O is such that the vehicle speed at which the center of window 18 is positioned on to the straight line 2a, 3a is equal to $V_1$, which speed value is bracketed on FIG. 1 beside the point in question.

The pair 2b, 3b is angularly offset towards the origin-direction O with respect to the pair 2a, 3a by an angle $\alpha$ such that when the sector 15 is in its datum position the center of window 18 is positioned on to the straight line joining source 2b to detector 3b at a vehicle speed $V_3$ less than $V_1$.

When the throttle-valve is fully closed the axle 11 is in contact with the end 12a of slot 12, thus constraining the arm 10 to rotate from its datum position corresponding to the throttle in its closed position through an angle $\beta$ to bring the axle 11 into abutment against the other end 12b of slot 12 and thereafter drive sector 13, shaft 5 and sector 15 against the resistance of spring 20. Since the multiplication ratio introduced by the mechanism 8 between the throttle-valve spindle and the arm 10 is n, the throttle must be open at an angle of at least $\beta/n$ before the axle 11 can drive sector 13.

When the throttle-valve is fully open, the sector 13 and, with it, the sector 15, the detectors 3a, 3b and the light sources 2a, 2b will have rotated in the direction of arrow F through an angle such that the vehicle speeds at which the center of window 18 will lie on the straight lines joining the pairs 2a, 3a and 2b, 3b, respectively, will be $V_2$ and $V_4$.

The electric pulse produced by the detector 3a when it is illuminated is used to command a change up into a higher gearbox ratio, namely into fifth gear in the example herein considered (i.e. an upward change), whereas the electric pulse produced by detector 3b is used to command a gear change into the immediately lower gearbox ratio, namely into fourth gear in the example herein considered (i.e. a downward change).

Disc 19 is formed with an arcuate slot 21 the center of which is the center of the disc and the radius of which is less than the distance of window 18 from said center. Slot 21 begins substantially upon the same radius as window 18 and extends away from the latter in the direction opposite to the direction in which disc 19 rotates as the speed of the vehicle increases, that is to say in the opposite direction to arrow F.

A light source 2c and a photoelectric detector 3c, both stationary, are associated with slot 21. Source 2c and detector 3c are positioned on either side of disc 19, on a straight line parallel to the axis of shaft 6 and at the same distance from said axis as the slot 21.

The straight line joining the stationary pair 2c, 3c intercepts disc 19 at a point the polar angle of which with respect to the origin-direction O is such that the speed of the vehicle must reach a value $V_5$ lying between $V_1$ and $V_4$ for the leading edge of slot 21 (in the direction of arrow F) to be able to reach this point and thereby allow the source 2c to begin to illuminate detector 3c.

Detector 3c is connected to an electronic unit 4c adapted to emit an electrical signal when detector 3c is illuminated. As will be explained hereinafter, this signal is used to cause latching of a manual gear lever (not shown).

FIG. 2 is a block diagram of the electronic units 4 and 4c which allow firstly of causing an automatic gear change when the source 2a or 2b illuminates the associated detector 3a or 3b, and secondly of latching a manual gear-change lever under certain specific conditions.

Photosensitive detector 3a is electrically connected to a circuit 22 adapted to generate a positive pulse that commands an upward change to the immediately higher ratio and is applied to the appropriate input of a bistable switching circuit 23. The output from bistable switching circuit 23 is in the "O" logic state when the electronic unit is energized.

The output from circuit 23 switches the the "1" logic state when circuit 22 applies a positive pulse to said input of circuit 23.

The output from circuit 23 is connected to a power amplifier circuit 24 having its output connected to the winding of a relay 25 that controls an electrically operated valve 26 which upon being energized causes an upward gear change, namely engagement of fifth gear.

A contact 27 is connected in series with the winding of relay 25 in such manner that the latter can be energized only when contact 27 is closed. For contact 27 to be closed, a manual gear-change lever, permitting engagement of first, second, third and fourth gears, must be in the position corresponding to fourth gear.

Photosensitive detector 3b is electrically connected to a circuit 28 similar to circuit 22, the output from which is connected to the other input of bistable switching circuit 23. When a positive pulse appears at the output of circuit 28, the output of bistable circuit 23 reverts to the "O" state if it was formerly in the "1" state. This causes relay 25 to drop out and electrically operated valve 26 to cease to be energized, thereby causing a change-down from fifth gear to fourth gear.

The photosensitive detector 3c, the function of which is to mechanically latch the gear lever, is connected to one input of an AND gate 29. A second input of AND gate 29 is connected to the input of the winding controlling valve 26 in such manner that a pulse is present on said second input only if valve 26 is energized.

The output from gate 29 is connected to a circuit 30 for activating an electromagnet 31 which mechanically latches the gear lever (not shown).

Thus, for the gear lever to be latched it is necessary for fifth gear to be engaged (electrically operated valve 26 energized) and for photosensitive detector 3c to be illuminated, in which case there is an output signal from gate 29 to cause latching through excitation of electromagnet 31.

The light sources 2a, 2b, 2c can be either miniature lamps or photoemissive diodes which emit electromagnet radiation in the visible or infrared region of the spectrum.

The detectors 3a, 3b, 3c can be either low-cost photoresistive cells or photodiodes or phototransistors.

All the electronic circuits mentioned hereinabove are of very small size and can be incorporated in a compact cylindrical housing (not shown) mounted on the throttle-valve control linkage, close to the carburettor (or to the throttle-valve box in the case of vehicles using fuel injection).

It is now proposed to describe the theory of operation of the device shown in FIG. 1 when associated with the electronic unit of FIG. 2, the whole with reference to FIGS. 3 and 4.

As explained precedingly, it will be assumed that the device of this invention is used to automatically control the highest gear ratio — taken to be fifth gear — and that it is capable of causing changes from fourth to fifth gear or vice versa, depending on engine operating conditions.

Consider first the case of an upward change from fourth to fifth gear (FIG. 3).

It will first be assumed that the throttle-valve aperture is less than $\beta/n$, that is to say that the axle 11 (FIG. 1) has not yet begun to drive the sector 13.

Sector 15 will therefore be in the position shown in FIG. 1.

If the vehicle is in fourth gear and begins to run down a slight declivity which causes its speed to increase, the disc 19 will rotate in the direction of arrow F. When the speed of the vehicle reaches the value $V_1$ mentioned precedingly, the window 18 will have its center lying on the straight line joining the source 2a to the detector 3a, whereby the latter will be illuminated and circuit 22

(FIG. 2) will emit a pulse to command an upward change to fifth gear (contact 27 being closed, since it is assumed the vehicle was previously in fourth gear).

Provided that the axle 11 has not driven sector 13, the upward change from fourth to fifth gear will occur at the speed $V_1$, so that, in the case of FIG. 3 in which vehicle speed V is represented along the X-axis and throttle-valve aperture angle A along the Y-axis, the law whereby upward changes from fourth to fifth gear occur for throttle-valve openings less than the angle $\beta/n$ will be represented by the straight-line segment $e$, $f$, parallel to the Y-axis.

Again assuming that fourth gear is engaged, but in this case that the throttle-valve opening angle is at a maximum, then on the basis of the explanations given hereinbefore it will be appreciated that axle 11 will have rotated sector 13 and, with it, sector 15 and detector 3a, 3b in the direction of arrow F. It will be necessary for the vehicle to reach the speed $V_2$ referred to previously for window 18 to have its center lying on the straight line joining source 2a and detector 3a. Hence the upward change from fourth gear to fifth gear will take place at a speed $V_2$ higher than $V_1$.

For all throttle-valve openings lying between maximum opening (PO) and the opening $\beta/n$, the change from fourth to fifth gear will take place at a vehicle speed lying between $V_1$ and $V_2$, and this according to a linear law represented by the sloping straight-line segment $g$ in FIG. 3.

It is to be noted that disc 19 is capable of greater maximum rotation than the throttle-valve, which is why the mechanism 8 (FIG. 1) is necessary between the throttle-valve spindle and the arm 10 so as to cause the amplitude of the rotation of arm 10 to be a multiple of the throttle-valve rotation.

Downward changes from fifth to fourth gear take place as follows:

For a downward change from fifth to fourth gear to be commanded, window 18 must have its center lying on the straight line joining source 2b to detector 3b. Now when the throttle-valve is fully open, detector 3b lies in a position such that if the vehicle's speed is higher than $V_4$ window 18 lies ahead (in the direction of arrow F) of the point at which the straight line joining the pair 2b, 3b intercepts the plane of disc 19. Consequently when the speed of the vehicle is higher than $V_4$ there can be no downward change from fifth to fourth gear.

It will now be assumed that the vehicle speed has stabilized at a value less than or equal to $V_4$.

If the throttle-valve is then opened because of a need to accelerate hard, sector 15 will rotate in the direction of arrow F and the straight line joining the pair 2b, 3b will pass through the window 18, causing photosensitive detector 3b to be illuminated and an electric pulse to be delivered by circuit 28 (FIG. 2) to switch the output of bistable switching circuit 23 from the "1" state to the "0" state. This in turn will cause relay 25 to drop out and electrically operated valve 26 to be de-energized, thereby causing a change down from fifth to fourth gear.

The angular position of the throttle-valve at which this downward change occurs depends on the speed of the vehicle, since the relationship between throttle-valve opening and vehicle road speed is a linear one and is represented by sloping straight-line segment $h$ parallel to segment $g$ on FIG. 4.

Assuming next that the throttle-valve is fully open (represented as PO along the Y-axis in FIG. 3), i.e. with the driver depressing the accelerator pedal to its limit and the vehicle travelling at its maximum speed, this speed will nevertheless diminish if the vehicle begins to run up a steep hill in fifth gear.

If the driver keeps his foot pressed hard on the accelerator, sector 15 and detectors 3a, 3b are maintained in the position most remote from the datum position. However, the window 18 which was previously ahead of detector 3b (in the direction of arrow F) will rotate in the opposite direction to arrow F as the vehicle begins to slow down. When the road speed becomes equal to $V_4$, the window 18 will lie on the straight line joining the pair 2b, 3b and a change down to fourth gear will be commanded.

If the driver releases the accelerator pedal, thus causing the throttle-valve opening to be substantially zero and in any event less than the angle $\beta/n$, the change down from fifth to fourth gear will take place at the speed $V_3$ at which window 18 lies on the straight line joining the source 2b to detector 3b, said source and detector lying in their datum positions. The change down from fifth to fourth gear will take place at the speed $V_3$ so long as the axle 11 (FIG. 1) has not shifted sector 13.

In order to improve operation of the automatic gear change device hereinbefore described, it is preferable to render it insensitive to possible driver hesitations leading to throttle-valve oscillation.

If when accelerating in fourth gear, for instance, the driver eases his foot on the accelerator slightly as the result of a hesitation, the throttle-valve will rotate in the closing direction, thus causing sector 15 to rotate in the direction opposite to that of arrow F. Now it could happen that the throttle-valve rotates to a sufficient extent for the straight line joining the pair 2a, 3a to pass through window 18, in which case an upward change from fourth to fifth gear will be commanded — a situation which would be undesirable if the vehicle were being accelerated and the driver were to ease his pressure on the accelerator pedal only due to a slight hesitation.

In order to prevent such changes from fourth to fifth gear, the response time of circuit 22 (FIG. 2) is so adjusted that this circuit delivers an output pulse only provided that detector 3a has been illuminated for a sufficient space of time, thereby rendering circuit 22 insensitive to rapid throttle-valve fluctuations.

Hence if the driver quickly lifts his foot off the accelerator when accelerating in fourth gear, the command for the upward change to fifth gear will not be generated and fourth gear will remain engaged, thus enabling maximum advantage to be taken of the braking effect of the engine on the overrun; similarly, if the throttle is opened abruptly once more in order to resume acceleration in fourth gear, the command for the change to fifth gear will not be given because the straight line joining the pair 2a, 3a will transit past the window 18 too quickly for the time for which detector 3a is illuminated to be sufficient to make circuit 22 react. It is consequently possible to make maximum use of the vehicle's performance capabilities.

If, on the other hand, the driver wishes to stop accelerating in order to adopt a steady crusing speed, he must ease pressure on the accelerator pedal gently and slowly in order to ensure that the time for which detector 3a is illuminated as the straight line joining the pair 2a, 3a transits past window 18 is long enough for circuit 22 to react and thereby deliver an output pulse to command the upward change to fifth gear.

With regard to circuit 28, the output pulses from which command downward changes from fifth to fourth gear, its response time is very short since it is necessary to be able to change down regardless of the rapidity with which the throttle-valve is opened.

Consider the case of a driver beginning to run downhill in fourth gear with his foot off the accelerator, that is to say with the throttle-valve closed or slightly open and the road speed below $V_1$. Now if the slope is steep enough the speed of the vehicle may increase and reach the value $V_1$ at which an upward change from fourth to fifth gear would normally be commanded, and this notwithstanding the relatively long response time of circuit 22, since, due to the fact that the speed of the vehicle increases only gradually, the time for which detector 3a is illuminated would be long enough for a pulse to be delivered at the output of circuit 22 to command the upward change from fourth to fifth gear.

Such a gear change would be undesirable since it would reduce the braking effect of the engine.

This drawback is overcome by providing a contact 32 (FIG. 2) which is adapted to close when the driver takes his foot off the accelerator; when closed, contact 32 interdicts the change from fourth to fifth gear, for instance by preventing delivery of an output pulse from circuit 22 irrespective of the illumination time of detector 3a (by earthing a suitable point in circuit 22).

It should be noted however that the dynamic latching provided by the relatively long response time of circuit 22 remains desirable chiefly because, due to the existence of the slot 12, when the driver lifts his foot off the accelerator, sector 13 and with it the detector 3a and the light source 2a revert to their datum positions before axle 11 reaches the edge 12a of slot 12, i.e. before the throttle-valve has fully closed and contact 32 has closed. Hence if the window 18 should intercept the line joining the pair 2a, 3a during the time interval required for axle 11 to move between the two ends 12b and 12a of slot 12 (while sector 13 and with it detector 3a are stationary), then if there were no dynamic latching to cause the response time of circuit 22 to be longer than the time required for axle 11 to move from end 12b to end 12a of slot 12, an upward change from fourth to fifth gear would be commanded by virtue of detector 3a having been illuminated.

When the speed of the vehicle is equal to or greater than the value $V_5$, the slot 21 will be intercepted by the line joining the pair 2c, 3c (FIG. 1). By reason of the shape of slot 21, for all road speeds above $V_5$ the detector 3c will be illuminated and will deliver a signal to one of the inputs of AND gate 29 (FIG. 2). If fifth gear is engaged, a signal will be present also on the other input of AND gate 29. Hence a signal will be delivered at the output of gate 29 and will operate through control circuit 30 on the electromagnet 31 whereby to latch the manual gear-lever.

Thus as long as the speed of the vehicle remains above $V_5$ and fifth gear is engaged, the driver cannot operate the manual gear-lever (which is in the fourth-gear position) in order to shift it to the third-gear position, for example. For, clearly, any attempt to make such a change would be dangerous since it would involve changing down from fifth to third gear at a road speed such that engine RPM would be too high after the downward change for the engine to withstand.

Figure 5:
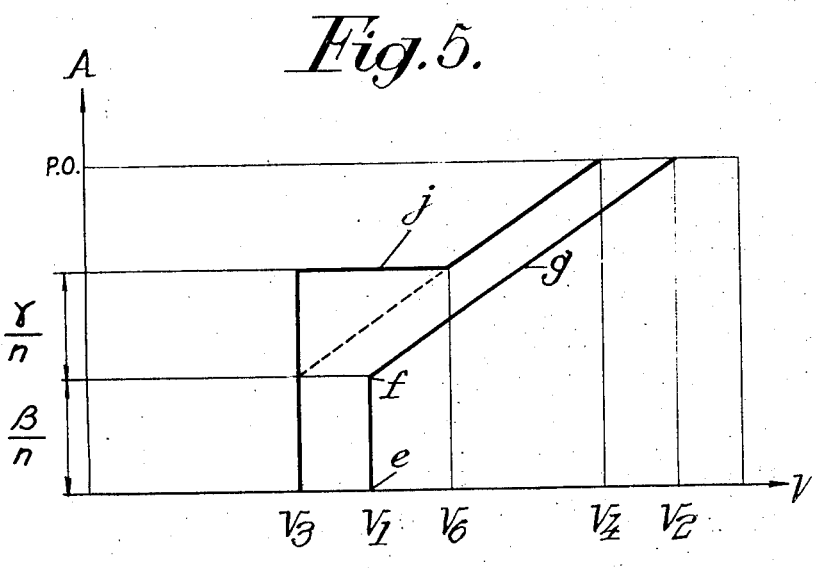
FIG. 5 is an alternative embodiment of FIG. 4.

Reference to FIG. 5 shows the graph plot for a law of upward changes from fourth to fifth gear that is somewhat different from the plot in FIG. 4 and includes a section j parallel to the X-axis, i.e. to the speed axis. This law makes it possible to hold fifth gear more readily during slight accelerations, that is to say when there is a slight additional opening of the throttle-valve at slow road speeds, namely at speeds lying between the values $V_3$ and $V_6$ shown on FIG. 5.

On the other hand, the law for changes from fifth to fourth gear remains unchanged.

Figure 6:
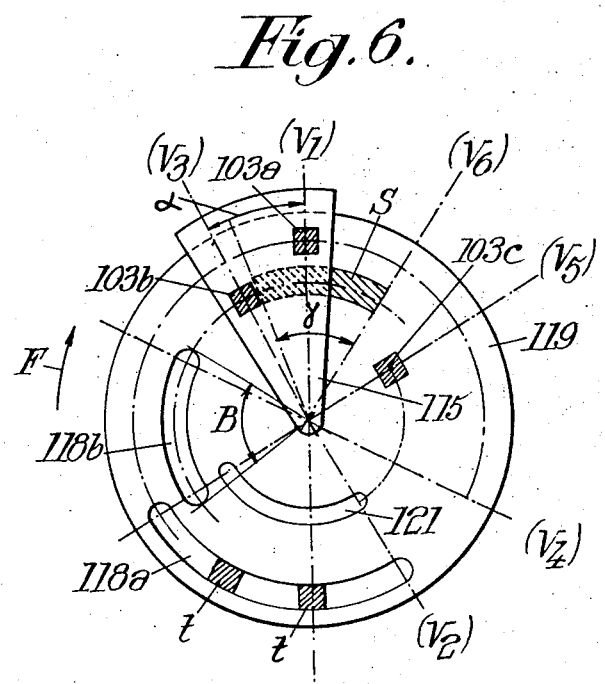
FIG. 6 shows in side elevation the automatic control device allowing obtainment of the laws for the upward and downward changes of FIG. 5.

The mechanism permitting changes from fourth to fifth or from fifth to fourth gear, in accordance with the two laws shown in FIG. 5, is depicted in FIG. 6.

This mechanism is virtually identical to the mechanism 1 in FIG. 1, and only those parts thereof which have been modified somewhat are shown in FIG. 6. Manifestly, the rotating shafts 5 and 6 still exist, as do the sector 13, the axle 11 and the arm 10 (not shown).

The mechanism shown in FIG. 6 comprises a disc 119 which, like the disc 19 of FIG. 1, acts as a screen between the light sources (not shown) and the photosensitive detectors 103a, 103b, which are similar to the detectors 3a and 3b of FIG. 1. The detectors 103a, 103b are radially offset with respect to each other in such manner that the detector 103a (and its associated light source, not shown) describes a circumference having its center lying on the common geometrical axis of the rotating shafts (not shown, but which are counterparts of the shafts 5 and 6 of FIG. 1) and having a radius greater than that of the circumference described by detector 103b (and its associated light source).

With detector 103a, which is adapted to command changes from fourth to fifth gear, is associated a window 118a formed in disc 119 and extending over a circular arc the radius of which is equal to the distance of detector 103a from the rotation axis.

With detector 103b is associated a window 118b formed in disc 119 and extending along a circular arc the radius of which is equal to the distance of detector 103b from the rotation axis.

The windows 118a, 118b extend substantially to either side of a radius of the disc 119, with the window 118b extending forwardly thereof (in the direction of arrow F) and the window 118a extending rearwardly thereof.

The two circle-sectors which are bounded respectively by these two windows and by the pairs of radii of disc 119 tangential to their ends, overlap each other slightly.

A fixed screen S shaped as a circular ring segment is positioned between disc 119 and a sector 115 similar to the sector 15 of FIG. 1 and carrying the detectors 103b and 103a. The middle line through the sector or screen S lies on a circumference which is centered upon the geometrical axis of rotation of disc 119 and sector 115 and has a radius equal to the distance of window 118b from said axis. Thus the screen S is capable of masking the detector 103b when the line joining the latter to the associated light source (not shown) intercepts the sector S.

The leading radial edge of sector S (in the clockwise direction of rotation of arrow F) lies in an angular position which is reached by the leading edge of window 118a when the speed of the vehicle is equal to $V_6$ (FIG. 5). Preferably, $V_6$ is chosen equal to $V_4 + V_3/2$.

The trailing radial edge of sector S occupies an angular position which is reached by the leading edge of window 118a and the trailing edge of window 118b when the speed of the vehicle is slightly greater than $V_3$.

The angle B (FIG. 6) formed between the radii of disc 119 tangential to the two ends of window 118b is slightly greater than the angle Δ formed between the radii of disc 119 tangential to the edges of sector S.

The arc subtended by the angle B is therefore substantially equal to the difference between the angular amplitudes, marked ($V_6$) and ($V_3$), of the rotations of screen 119 corresponding to the speeds $V_6$ and $V_3$ respectively. Since $V_6 = V_4 + V_3/2$, $V_6 - V_3 = V_4 - V_3/2$, . The value of angle B is therefore substantially equal to half the difference between the angular amplitudes of rotation of screen 119 corresponding respectively to the speed $V_4$ for downward changes at maximum throttle-valve opening and to the speed $V_3$ for downward changes at minimum throttle-valve opening.

The window 118a similarly consists of a circular ring segment extending along an arc the value of which is substantially equal to the difference between the angular amplitudes of rotation of disc 119 for vehicle speeds equal to $V_4$ and $V_1$ respectively.

One or more opaque zones $t$ (FIG. 6) are provided in window 118a in order to divide it into a plurality of elemental windows extending along substantially equal arcs.

As in the embodiment of FIG. 1, a window 121 similar to the window 21 of FIG. 1 is provided in the disc 119 and is associated with a fixed detector 103c and with a light source (not shown). The purpose of detector 103c is to command latching of the manual gear-change lever in the manner explained hereinbefore.

The circuit diagram for the electronic unit associated to the device of FIG. 6 is similar to that shown in FIG. 2, except that a capacitor 32a is parallel-connected to the terminals of contact 32 and is shown in dot-dash lines in FIG. 2.

The theory of operation of the device shown in FIG. 6 is as follows:

It will be assumed that the driver has engaged fourth gear and that the gear-change lever is therefore in the fourth-gear position. The law for upward changes from fourth to fifth gear is the same as in FIG. 4.

Consideration will now be given to the law for downward changes from fifth to fourth gear, an upward change from fourth to fifth gear having been automatically commanded previously. This means that the window 118a and, with it, the disc 119, will have rotated sufficiently to place the detector 103a which commands upward changes in communication with its associated light source. As a result, the window 118b, which is shifted forwardly in the direction of arrow F with respect to window 118a, will have been positioned ahead (in the direction of arrow F) of the downward changes commanding detector 103b.

This being so, should the driver lift his foot off the accelerator, i.e. should the throttle-valve opening become small or null, and should the speed of the vehicle diminish, detector 103b will occupy its resting position and disc 119 will rotate in the opposite direction to arrow F due to the decreasing speed of the vehicle.

Since detector 103b is in its datum position, the screen S cannot intercept the light emitted by the source associated with detector 103b and directed thereat.

When the speed of the vehicle has dropped sufficiently and the disc 119 has rotated in the opposite direction to arrow F through an angle such that the trailing edge (with respect to a clockwise rotation) of window 118b intercepts the straight line joining detector 103b and its associated light source, said detector 103b will be illuminated and will command a downward change from fifth to fourth gear. As explained precedingly, the road speed at which this downward change is commanded is equal to the value $V_3$.

It will be assumed next that the speed of the vehicle has steadied between the values $V_3$ and $V_6$ with fifth gear engaged. It will further be assumed that the driver, who previously had his foot off the accelerator, depresses the latter fully so as to cause the throttle-valve to move from its closed to its open position.

Since the speed of the vehicle lies between the values $V_3$ and $V_6$, the trailing edge of window 118b (with respect to the direction of arrow F) will be masked by the screen S. On the other hand, the leading edge of window 118b will be unmasked since window 118b extends along an arc slightly greater than that of the screen S.

Hence, during the acceleration phase, as soon as the detector 103b, which will rotate with sector 115 in the direction of arrow F, reaches an angular position with the same polar angle as the trailing edge of window 118b, the screen S will intercept the light from the source associated with detector or 103b and prevent it from illuminating the latter, whereby no downward change command will be given.

Only when the throttle-valve has opened sufficiently for the detector 103b to cross the leading edge of sector S will it be possible for detector 103b to be illuminated by its associated light source, whereupon the command for a downward change to fourth gear will be given.

Consequently, for all vehicle speeds included between $V_3$ and $V_6$, this command for a downward change from fifth to fourth gear will be given for a throttle-valve opening angle equal to the sum of the quotient $\beta/n$ (where $\beta$ is the angle subtended by the slot 12 and $n$ is the multiplication ratio of the device 8) and the quotient $\gamma/n$.

If the vehicle speed lies between the values $V_6$ and $V_4$ and the vehicle is accelerated whilst in fifth gear, a downward change from fifth to fourth gear will be commanded as soon as the detector 103b, which will rotate in the direction of arrow F, has overtaken the rear edge of windown 118b. Thus, between the values $V_6$ and $V_4$, the law shown in FIG. 4 for downward changes from fifth to fourth gear obtains.

By comparison with the circular window 18 of FIG. 1, the arcuate window 118a of FIG. 6 allows fifth gear to be re-engaged more easily subsequent to a latching in fourth gear with the foot off the accelerator. For in the case of FIG. 1, if during acceleration in fourth gear the driver takes his foot off the accelerator at a high speed close to $V_4$, for example, fourth gear remains engaged by virtue of the dynamic latching system referred to precedingly and which stems from a relatively long response time of circuit 22. However, window 18 will have moved behind the line joining the pair 2a, 3a, with respect to the direction of arrow F.

If now the driver presses the accelerator once more and imparts a larger throttle-valve opening so as to stabilize the road speed at said value close to $V_4$, a steady state could occur in which the window 18 lies ahead of the line joining the pair 2a, 3a (in the direction of arrow F). This being so, the driver might experience some difficulty in bringing the center of window 18 on to the line joining the pair 2a, 3a in order to bring about a change up to fifth gear.

With the arrangement shown in FIG. 6, this drawback is eliminated since the window 118a extends over a relatively long arc rearwardly from its front end, in the opposite direction to arrow F. The position of this front end is the same as that of the front end of window 18 in the device shown in FIG. 1.

By reason of the very compass of window 118a, the dynamic latching referred to precedingly, which was obtained through a relatively long response time of circuit 22 (FIG. 2), is no longer possible. Consequently the response time of circuit 22 can be as short as that of the circuit 28 commanding downward changes.

The latching function with the foot off the accelerator will be obtained by means of the contact 32 of FIG. 2 which is adapted to close when the driver lifts his foot off the accelerator. The capacitor 32a is preferably provided in order to introduce a time-delay into the latching process. Thus when the driver stops accelerating in fourth gear by lifting his foot off the accelerator, the closed-valve contact clamps the circuit 22 and prevents the change from fourth to fifth gear when the window 118a crosses the line 2a, 3a. Then if the driver resumes acceleration in fourth gear, the capacitor 32a prevents release from taking place as soon as contact 32 opens, i.e. as soon as the driver presses the accelerator once more. Thus when the window 118a crosses the line joining the detector 103a to its associated source, the process of charging capacitor 32a will prevent the upward change to fifth gear from taking place for a predetermined time-lag. The charging time is chosen sufficiently long so that, under normally foreseeable conditions, the time taken by the detector 103a to cover the angle subtended by window 118a is not longer than said charging time.

However, the above explanation is based on the assumption that in resuming acceleration in fourth gear the driver depresses the accelerator pedal fast enough to move the sector 115 with sufficient speed.

Naturally, this movement can be very slow, in which case the time-lag introduced by capacitor 32a would be insufficient, so that a resumption of acceleration could cause a change up to fifth gear.

Owing however to the presence of opaque zones t in the window 118a, the line joining detector 103a to its light source, which will be crossing the window 118a relatively slowly during this phase of relatively slow opening of the throttle-valve, will cross the opaque zones t, thereby causing detector 103a to be occluded and not illuminated. As a result, capacitor 32a, which had charged throughout the time detector 103a was illuminated, will discharge during the time taken by detector 103a to cross opaque zone t. Hence the time-lag is increased by virtue of this discharging of the capacitor.

These opaque zones enable the stability of the device to be improved in dense traffic situations, when the throttle-valve is being continually actuated.

Figure 7:
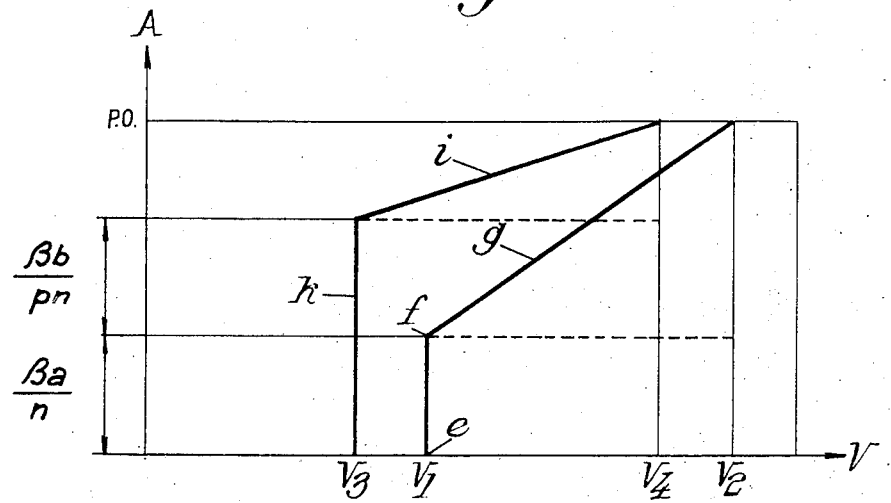
FIG. 7 is an alternative embodiment of FIG. 4.
Figure 8:
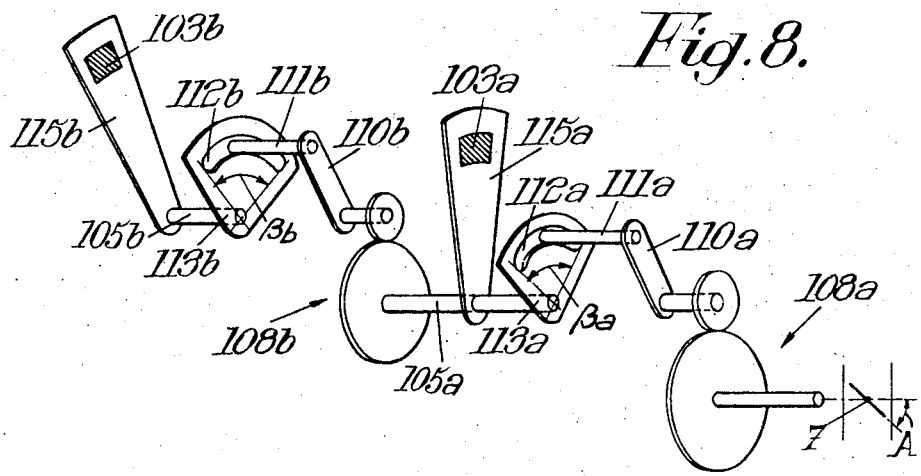
FIG. 8 is a perspective showing of part of the automatic control device for obtaining the laws for the upward and downward changes of FIG. 7.

Reference is now had to FIG. 8 for a showing of part of an automatic control device according to this invention, permitting obtainment of a law for downward changes from fifth to fourth gear, the graphic representation of which includes a sloping straight-line segment $i$ having a slope different to that of the segment $g$ of the law for upward changes from fourth to fifth gear. These two laws for upward and downward changes, respectively, are shown in FIG. 7. The limit road speed above which it is no longer possible to change down from fifth to fourth gear is retained once more as $V_4$.

As shown in FIG. 8, the sector 13 of FIG. 1 is in this instance separated into two distinct parts 113a, 113b, respectively, having slots 112a and 112b formed therein.

A shaft 105a fast with sector 113a and perpendicular to the plane thereof drives another sector 115a lying in a plane likewise perpendicular to the axis of the shaft 105a. This sector 115a carries the photosensitive detector 103a associated with a light source (not shown).

A shaft 105b fast with the sector 113b extends in a direction perpendicular to the plane thereof and supports a further sector 115b lying in a plane perpendicular to the axis of shaft 105b. This sector 115b carries the photosensitive detector 103b associated with a light source (not shown).

The two associated pairs of light sources (not shown) and photosensitive detectors (103a, 103b) are mutually offset in a direction perpendicular to the axis of shaft 105a. The screen (not shown) which is positioned between the light sources and the detectors 103a, 103b is similar to the disc 119 of FIG. 6 and is formed with two windows, similar to the windows 118a, 118b, located at different distances from its rotation axis to enable them to co-act with the respective pairs of light sources and photosensitive detectors.

Sector 113a is driven by a mechanism similar to that shown in FIG. 1, capable of imparting to it a rotation of angular amplitude proportional to the degree of opening of the throttle-valve. This mechanism includes an axle 111a adapted to cooperate with the slot 112a, an arm 110a and a multiplier mechanism 108a consisting for instance of two friction rollers of different diameters adapted to rotate the arm 110a through an angle equal to $n$ times the angle through which the throttle-valve has rotated.

A mechanism similar to the one provided between throttle-valve spindle 7 and shaft 105a is provided between shaft 105a and shaft 105b, like parts to those of the mechanism associated with shaft 105a bearing the suffix letter $b$ instead of $a$.

The multiplier device 108b is capable of rotating the arm 110b through an angle equal to p times the angle through which shaft 105a and sector 113a rotate.

The angle subtended by slot 112b is equal to $\beta_b$, and the initial mutual angular offset between detectors 103a and 103b is the same as the angular offset $\alpha$ between detectors 3a, 3b of FIG. 1.

The manner of operation and the laws for upward and downward gear changes provided by the device of FIG. 8 may be deduced immediately from the laws obtained with the device of FIG. 1.

The law for upward gear changes, namely from fourth to fifth gear, remains unaltered since these changes are commanded by the detector 103a, the angular movements of which are identical to those of detector 3a in FIG. 1.

On the other hand, the law for downward changes from fifth to fourth gear is modified.

The initial angular offset between detectors 103a and 103b is maintained at $\alpha$ so that, when the throttle-valve is closed, downward changes from fifth to fourth gear should always take place when the vehicle reaches a speed of $V_3$.

The graphic representation of the law for downward changes therefore invariably includes a straight-line segment $k$ (FIG. 7) parallel to the Y-axis, passing through the point $V_3$ on the X-axis.

The slope of the segment i (FIG. 7) is equal to the quotient obtained by dividing the slope of the segment g for the law of upward changes by the multiplication ratio $p$ provided by the device 108b.

Since the value $V_4$ is retained, the end of the segment $i$ corresponding to maximum throttle-valve opening lies in a determinate position, of abscissa value $V_4$. Hence the straight-line segment k must have a determinate length $l$.

Now $1 = \beta a/n + \beta b/pn$, and since 1, $\beta_a$, $n$ and $p$ are known, $\beta_b$, the angle subtended by the slot 112b, can easily be calculated.

The example given below, using numerical values, is intended to provide a concrete illustration of the explanations given hereinbefore;

The disc 19 (or 119) rotates through 30° for a change in road speed of 20 kilometers per hour (or 5.55 m/sec).

The upper ratios (third, fourth and fifth gears) of the gearbox are characterised by the following numerical values:

|  | ROAD SPEED | ENGINE ROTATION SPEED |
|---|---|---|
| 3rd gear | 21.48 kilometers/hour | 1000 RPM |
| 4th gear | 29.27 kph | 1000 RPM |
| 5th gear | 36.22 kph | 1000 RPM |

$V_1$ is taken equal to 90 kph, and
$V_3$ is taken equal to 70 kph.
A difference of $V_1 - V_3 = 20$ kph corresponds to $\alpha = 30°$.

Taking $V_2 = 165$ kph, then $V_4 = V_2 - (V_1 - V_3) = 145$ kph.

A speed of $V_4 = 145$ kph corresponds to engine speeds of 4,000 RPM in fifth gear and 5,000 RPM in fourth gear.

$V_5$ is chosen approximately equal to 110 kph.

The engine rotation speed at this road speed when third gear is engaged is approximately 5,000 RPM.

$\beta/n$ is chosen approximately equal to 30°.

Since $V_2 - V_1$ equals 165−90 = 75 kph, the disc 19 (or 119) rotates through an angle:

75/20 × 30° ≈ 113° when the road speed changes from $V_1$ to $V_2$.

Hence the sector 15 (or 115) must rotate substantially through the same angle when the angular opening of the throttle-valve increases from $\beta/n$ to the maximum value, say 87°, i.e. a change of 87° − 30° = 57°.

Now since the angle through which sector 15 (or 115) rotates is equal to $n \times 57°$, $n$ may be deduced to be approximately equal to 113°/57° and is taken equal to 2.

Hence $\beta = n \times 30 = 60°$.

The disc 19 (or 119) will remain in abutment against its datum position as long as the road speed of the vehicle remains less than or equal to 10 kph.

Hence the initial angular offset $\psi$ between the detector 3a (or 103a) and the window 18 (or 118) is equal to the angle through which the disc 19 (or 119) rotates when the road speed increases from the value 10 kph to the value $V_1 = 90$ kph, i.e. a change of 80 kph, to which corresponds an angle of 120°.

Latching window 21 (or 121) substends an angle corresponding to the difference between the maximum speed of the vehicle, approximately 200 kph, and $V_5 = 110$ kph, namely an angle of 90/20 × 30° = 135°.

Since $V_6 \approx V_4 + V_3 12 = 145 + 70/2 = 112.5$ kph,
$V_6$ is taken equal to 110 kph.

The angular aperture $\gamma$ of the screen S (FIG. 6) is taken equal to 56°, or slightly less than:

$$\tfrac{1}{2} V_4 - V_3/20 \times 30° = 57°.$$

B, the angle subtended by the window 118b (FIG. 6), is taken equal to 57°.

Lastly, in the embodiment shown in FIG. 8, $p = 2$ and $\beta_B = 120°$.

$\beta_A$ remains equal to 60° and $n = 2$.

Reference is next had to FIG. 9 for a portrayal of an alternative embodiment of the device of FIG. 1, permitting obtainment of the same laws for upward and downward gear changes as those shown in FIG. 4, but with a single fixed light source.

The disc 19 of FIG. 1 is replaced by a cylindrical shell 219 coaxial with the shaft 6 and angularly rigid therewith. A fixed light source 202 is mounted on the geometrical axis of cylinder 219 and is capable of radiating in all directions around its center.

Photosensitive detectors 203a and 203b similar to the detectors 3a, 3b are positioned on the inner surface of cylinder-wall portion 16, the centers of these detectors lying in a common plane perpendicular to the axis of shaft 6.

A fixed photosensitive detector 203c similar to detector 3c is positioned externally of the outer surface of the cylinder 219, at a distance from the axis thereof less than the distance of wall 16 from said axis. Detector 203c is offset along the axis of cylinder 219 in relation to detectors 203a and 203b.

The cylindrical wall of cylinder 219 is formed with two ports 218 and 221, the center lines of which lie in planes orthogonal to the axis of cylinder 219 and are mutually offset along that axis.

The windows 218 and 221 are similar to the windows 18 and 21 of FIG. 1. The leading edge (in the direction of arrow F) of window 218 lies on the same generatrix of cylinder 219 as the leading edge of window 221. On the other hand, window 221 extends farther to the rear than window 218.

The arcuate center lines of windows 218 and 221 lie respectively in planes containing the intersections of cylinder 219 with conical surfaces of revolution which are coaxial with cylinder 219 and the apices of which lie at the center of light source 202, and these planes pass through the centers of detectors 213a, 203b and through the center of detector 203c, respectively.

The theory of operation of this device will be clearly apparent from the above explanations. The various commands for upward or downward gear changes or for latching of the manual gear-lever will be given when the relevent detectors are illuminated by the single source 202, which will occur for determinate relative positions of the cylinder 219 and the wall 16.

Preferably, the cylinder 219 is extended axially, towards the shaft 6 and beyond the end of cylinder wall 16, by a portion L' the cylindrical surface of which is graduated in road speeds. Portion L' can be translucid and bear opaque graduation marks G, as shown in FIG. 9, or be opaque and bear graduation marks formed by indents. The portion L' is illuminated by a light source S' located within cylinder 219, on the geometrical axis of shaft 6, between the latter and source 202.

The whole arrangement is such that source S' does not illuminate detectors 203a, 203b, 203c, and source 202 does not illuminate graduated portion L'.

The brightness of light source S' can be adjusted, for instance by means of a rheostat (not shown), to suit the ambient lighting.

Portion L' is surrounded by a fixed opaque cylindrical sleeve M embodying a rectangular window J equipped with a pointer and possibly a magnifying glass. Window J is part of the vehicle's dashboard.

The driver is thus able to read the speed at which his vehicle is travelling, through the window J.

The window J and the portion L' jointly form the vehicle's speedometer.

It will be manifest from the exemplary embodiments hereinbefore described that the automatic control device for gearboxes according to the present invention is outstandingly simple and inexpensive.

It goes without saying that many changes and substitutions of parts may be made to the exemplary embodiments hereinbefore described without departing from the scope of the invention. More specifically, the invention includes in its scope all alternative embodiments in which the rotating shaft T is the engine drive shaft.

I claim:

1. For use in a vehicle having an engine equipped with a throttle valve, apparatus for automatically controlling changes in gear ratios in a multi-ratio gearbox coupled to said engine, comprising:

a first rotatable shaft;

means rotating said first shaft through an angle dependent upon the rotational speed of said engine;

a second rotatable shaft having its axis of rotation disposed parallel to the axis of rotation of said first shaft;

an emitter element for emitting electromagnetic radiation signals;

a receiver element for receiving electromagnetic radiation signals emitted from said emitter element;

at least one of said emitter and receiver elements being coupled to one of said shafts for rotation therewith;

a screen coupled with the other of said shafts for rotation therewith, said screen being disposed between said emitter and receiver elements to block radiation emitted by the former from being received by the latter;

at least one window formed in said screen pervious to said electromagnetic radiation, said window being so located in said screen as to communicate said emitter and receiver elements when said shafts are rotatably disposed in predetermined positions relative to each other;

drive means coupled to said engine throttle valve to continuously rotate said second shaft over a range of rotation of predetermined angular amplitude through an angle corresponding to the movement of said throttle valve; and control means coupled to said receiver element for generating an electrical signal when electromagnetic radiation signals from said emitter element impinge on said receiver element to produce an output signal therefrom, the output of said control means being coupled to said gearbox to actuate a change in the gear ratio thereof as a function of the output electrical signal generated by said control means.

2. The control apparatus according to claim 1, wherein said screen comprises a cylinder of revolution, said at least one window being formed in the cylindrical surface of said screen, and wherein said emitter element is stationarily mounted at a position coincident with the axis of rotation of said cylinder; said apparatus further comprising a cylindrical jacket at least partially surrounding the cylindrical surface of said screen, said receiver element being mounted on the inner surface of said jacket.

3. The control apparatus according to claim 2, wherein said screen is fixed to said first shaft, a portion of said screen comprising graduation marks adapted to travel past a window fixedly positioned in relation to a dashboard of said vehicle, said window and graduated portion jointly forming the speedometer of said vehicle.

4. The control apparatus according to claim 1, wherein said drive means comprises a multiplier mechanism for generating an angular rotational movement which is a multiple of the amount of angular rotational movement of said throttle valve, said multiplier mechanism being coupled to said second shaft to impart said multiplied angular rotational movement thereto; said apparatus further comprising a planar member mounted on said second shaft perpendicular to the axis of rotation thereof for rotation therewith, said planar member having an arcuate slot formed therein; a drive member coupled to said multiplier mechanism and mounted for movement in said arcuate slot of said planar member to transmit the multiplied angular rotational movement of said throttle valve to said second shaft above a minimum range of angular movement of said throttle valve determined by the arc subtended by said arcuate slot.

5. The control apparatus according to claim 4, further comprising: a third shaft having its axis of rotation at least parallel to that of said second shaft; a second receiver element, the first and second receiver elements being fixedly coupled to said second and third shafts, respectively, for rotation therewith, said first and second receiver elements being angularly displaced from one another about said parallel axes of rotation; a further planar member mounted on said third shaft for rotation therewith and having a further arcuate slot formed therein; a further multiplier mechanism coupled to said third shaft; a further drive member coupled to said further multiplier mechanism and mounted for movement in said further arcuate slot formed in said further planar member to transmit the multiplied angular rotational movement of said second shaft to said third shaft above and below a minimum range of angular movement of said second shaft determined by the arc subtended by said further arcuate slot.

6. The control apparatus according to claim 1, comprising a first pair of emitter and receiver elements rotatably coupled with one of said shafts, the angular amplitude of rotation of which is a function of a first range of movement of the throttle valve, said first pair of elements being adapted to command upward changes in gear ratio from a lower to a higher gear; a second pair of emitter and receiver elements; means rotatably coupling said second pair of elements to said one shaft for rotation therewith as a function of a second range of movement of said throttle valve, said second pair of elements being adapted to command downward changes in gear ratio from a higher to a lower gear; said first and second pairs of elements being mutually offset in a direction perpendicular to the axis of rotation of said one shaft; and wherein said screen is disposed in the respective paths between said emitter elements and said receiver elements and includes first and second windows pervious to said electromagnetic radiation, said windows being located in said screen at radial distances from the axis of rotation of the other of said shafts corresponding to the radial location of said first and second pairs of elements, respectively.

7. The control apparatus according to claim 1, further comprising a second receiver element mounted on the same shaft with the first receiver element for movement therewith and angularly displaced therefrom about an axis at least parallel to the axis of rotation of said one of said shafts, said second receiver element being electrically connected to said control means; wherein one of said receiver elements is adapted to produce an electrical signal for commanding an upward change in gear ratio from a lower gear to a higher gear and the other receiver element is adapted to produce a signal to command a downward change from a higher gear to a lower gear.

8. The control apparatus according to claim 7, further comprising a second emitter element disposed to cooperate with said second receiver element, said emitter elements and said receiver elements being mounted for rotation with said one of said shafts.

9. The control apparatus according to claim 8, wherein said second emitter and receiver elements are radially and angularly displaced from said first emitter and receiver elements, said emitter elements and said receiver elements being located in respective planes perpendicular to the axis of rotation of said one of said shafts, and wherein said screen is disposed in the respective paths between said first emitter and receiver elements and said second emitter and receiver elements and includes first and second windows pervious to said electromagnetic radiation, said windows being located in said screen at respective radial distances from the axis of rotation of said other of said shafts corresponding to the radial location of said first emitter and receiver elements and said second emitter and receiver elements, respectively.

10. The control apparatus according to claim 9, wherein said screen comprises a planar member mounted on said other shaft perpendicular to the axis of rotation thereof, and said first window has an arcuate shape subtending an arc substantially equal to one-half the difference between the amplitudes of angular rotation of said screen corresponding respectively to positions of maximum and minimum throttle valve openings, said first window being disposed in the path between said first emitter and receiver elements which command a downward change in said gear ratio from said higher to said lower gears; and said apparatus further comprises a fixed opaque sector radially displaced from the axis of rotation of said other shaft substantially the same distance as said first window, said opaque sector subtending an arc which is less than that subtended by said first window to at least partially mask said first window for a predetermined range of rotation of said screen.

* * * * *